(12) United States Patent
Tooman et al.

(10) Patent No.: US 6,808,350 B1
(45) Date of Patent: Oct. 26, 2004

(54) ANCHOR BOLT CAP AND METHOD OF USE

(76) Inventors: Norman L. Tooman, 2700 Larson La., Bakersfield, CA (US) 93304; Anthony Carvalho, 2700 Larson La., Bakersfield, CA (US) 93304

( * ) Notice: Subject to any disclaimer, the term of this patent is extended or adjusted under 35 U.S.C. 154(b) by 0 days.

(21) Appl. No.: 10/350,676

(22) Filed: Jan. 27, 2003

(51) Int. Cl.$^7$ ............................................... F16B 37/14
(52) U.S. Cl. ..................... 411/431; 411/372.5; 411/377
(58) Field of Search ........................... 411/372.5, 372.6, 411/373, 377, 431, 910, 907

(56) References Cited

U.S. PATENT DOCUMENTS

| | | | |
|---|---|---|---|
| 3,471,158 A | * 10/1969 | Solins | ..................... 411/431 X |
| 4,557,654 A | * 12/1985 | Masuda et al. | ............. 411/431 |
| 4,907,929 A | * 3/1990 | Johnston, Jr. | ............... 411/431 |
| 5,590,992 A | * 1/1997 | Russell | ....................... 411/431 |

* cited by examiner

*Primary Examiner*—Neill Wilson
(74) *Attorney, Agent, or Firm*—Charles C. Logan, II

(57) ABSTRACT

An anchor bolt cap for the top ends of anchor bolts that extend upwardly out of a base foundation onto which is mounted the tower base of a wind generator that produces electricity by rotation of the blades of the wind generator. The bottom end of the tower base of the wind generator has an outer annular flange and an inner annular flange each having a plurality of apertures spaced from each around the entire periphery of the respective flanges. The anchor bolts pass upwardly through these respective apertures and have a washer and nut threaded onto each of the respective anchor bolts for locking the tower base to the top of the base foundation. The anchor bolt caps are installed over the top ends of the respective anchor bolts and prevent moisture from attacking the anchor bolts and thereby prevent corrosion of the anchor bolts.

17 Claims, 2 Drawing Sheets

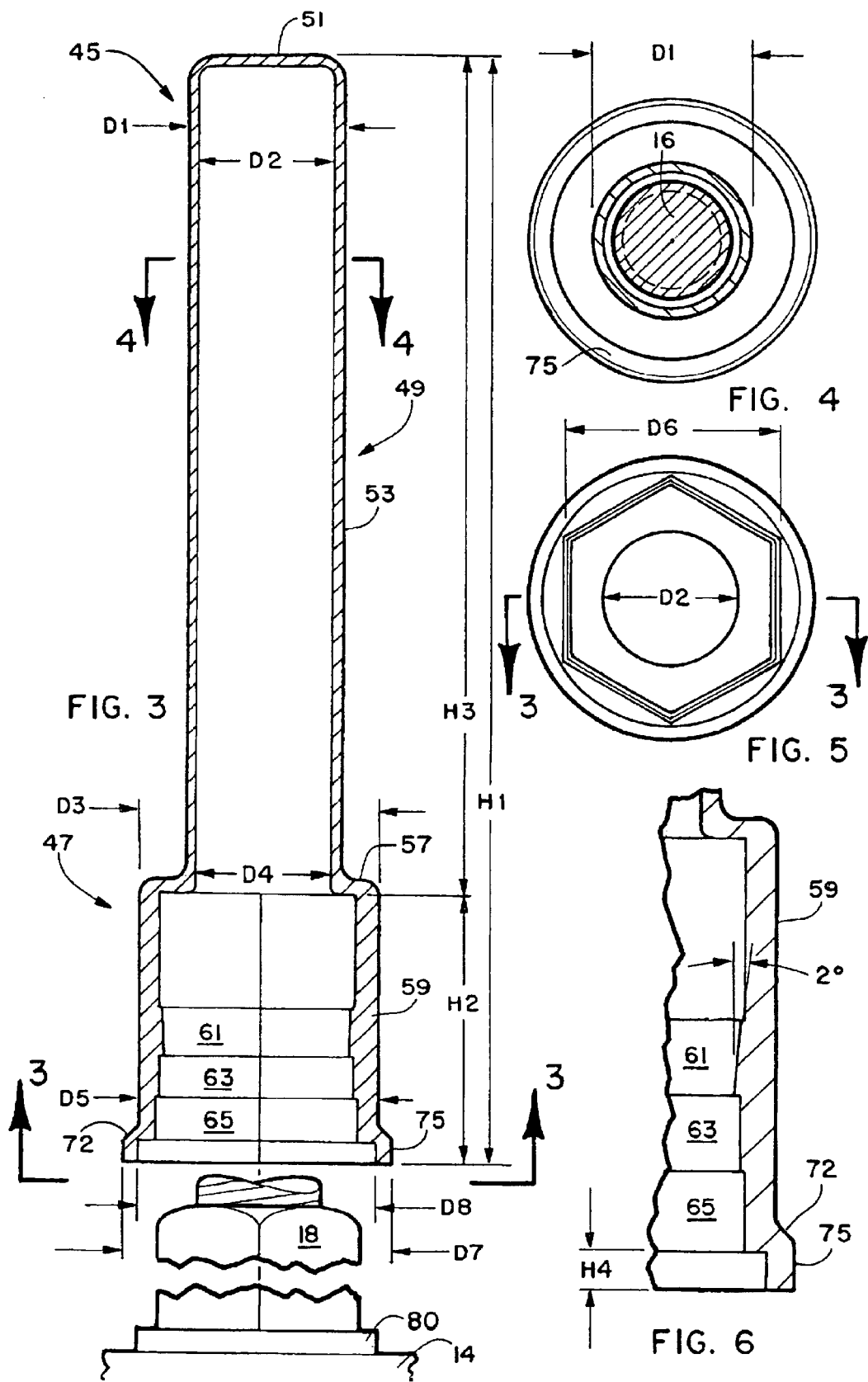

ANCHOR BOLT CAP AND METHOD OF USE

BACKGROUND OF THE INVENTION

The invention relates to wind generators used for producing electricity having propellers or blades that are rotated by the force of the wind to produce electrically. More specifically, the invention relates to bolt caps that are installed over the exposed top ends of the anchor bolts that secure the tower base to the foundation that is formed in the ground.

Presently there are numerous wind generators in existence that have a tower base 200 feet high or higher. These wind generators have blades or propellers up to 90 feet or longer. There may be as many as 240 or more anchor bolts used to secure the tower base to the foundation. The foundation itself may be in the order of 30 feet deep and these anchor bolts may also be in the order of 30 feet long. During the operation of anchoring the tower base to the foundation, a nut is tightened onto the top end of each of the anchor bolts. Next a second nut is threaded onto the top end of each of the anchor bolts. Then a hydraulic jack is used on each of the anchor bolts to stretch them by jacking them up with 70 to 80 thousand pounds of pre-stress tension and the first nuts are lightly tightened down. When the hydraulic pressure on the jack is released the prestressed anchor bolts tighten the nuts down against the annular flanges on the bottom end of the tower base. The top ends of the anchor bolts are now exposed to the elements such as sun, wind, rain, snow and moisture. Over time the moisture seeps down into the concrete around the anchor bolts in the foundation. This causes corrosion that weakens the anchor bolts and shortens the life of the tower base. Presently the wind generators and tower bases are amortized over about 20 years. By prevention corrosion to the anchor bolts, the life of the wind generator and its tower base can be extended several years. This is quite significant when it is kept in mind that a wind generator can cost a million or more dollars.

It is an object of the invention to provide a novel anchor bolt cap that can be used to cover the exposed top ends of anchor bolts used to secure the tower base of a wind generator to its foundation.

It is also an object of the invention to provide a novel anchor bolt cap that is designed to prevent it from rocking back and forth after it is installed on the top ends of anchor bolts used to secure the tower base of a wind generator to its foundation.

It is another object of the invention to provide a novel anchor bolt cap that has structure on the interior of its bottom end for centering and aligning the anchor bolt cap on a hexagonal nut that has been screwed onto the top end of the anchor bolts used to secure the tower base of a wind generator to its base foundation.

It is an additional object of the invention to provide a novel anchor bolt cap that is easily and quickly installed on the top ends of the anchor bolts used to secure the tower base of a wind generator to its base foundation.

It is a further object of the invention to provide a novel anchor bolt cap that is economical to manufacture and market.

SUMMARY OF THE INVENTION

Wind generators normally cost over a million dollars to manufacture and install them on an operational site. The base tower of the wind generators is often in the range of 200 feet high and the blades almost 100 feet long. The bottom ends of the tower base has to be secured to a substantial base foundation.

The base foundation is often in the order of 30 feet deep. The width of the base foundation is generally in the order of 10 to 15 feet in diameter. Approximately 250 anchor rods have their top ends extending upwardly from the top surface of the base foundation and they are spaced from each other in a circular pattern or a double circular pattern. These anchor rods have their bottom ends embedded in a tubular concrete structure that is formed on site.

The bottom end of the tower base has an outer annular flange and an inner annular flange and spaced apertures are formed in each of these around their periphery for mating with the respective top ends with the anchor bolts extending upwardly from the top surface of the base foundation. When the tower base is lowered onto the respective anchor bolts, they extend approximately ten inches above the top surface of the annular flanges on the bottom end of the tower base. A nut is threaded on the top end of each of the respective anchor bolts and snugged down against the top surface of the respective annular flanges. The reason for having approximately ten inches of the anchor bolts exposed is because a second nut is then threaded onto the "top end" of the respective anchor bolts and a hydraulic jack is attached thereto for stretching and stressing the anchor bolts to approximately 70 to 80 thousand pounds of stress. Before removing the hydraulic jacks, the bottom nut is snugged against the top surface of the respective flanges.

The exposed outer surface of the top ends of the anchor bolts then has a film of grease applied thereto that cuts off any oxygen contact with the threads of the anchor bolts. At this time, the novel anchor bolt caps are slid over the top ends of the anchor bolts. The nut reception portion of the anchor bolt cap has interior structure that functions to align and center the anchor bolt cap over the top of the nut now resting adjacent the top surface of the respective annular flanges of the tower base. The interior of the nut reception portion has hexagonal shaped stepped wall portions that progressively have a reduced width as they extend further into the interior of the nut reception portion. When properly aligned and centered, the bolt cap is easily pounded down onto the top of the nut and frictionally held in place. The width of the interior of the anchor bolt reception portion is only slightly larger than the diameter of the anchor bolt. This eliminates the possibility of the anchor bolt cap being rocked back and forth either by the stresses produced upon it when the generator is operating or by individuals attempting to rock the anchor bolt caps off.

DESCRIPTION OF THE DRAWINGS

FIG. 3 is a vertical cross section of the anchor bolt cap;

FIG. 4 is a vertical cross section taken along lines 4—4 of FIG. 3 and showing "the top end of an anchor" bolt received therein;

FIG. 5 is a bottom plan view of the anchor bolt cap; and

FIG. 6 is an enlarged partial vertical cross section of the bottom end of the anchor bolt cap.

DESCRIPTION OF THE PREFERRED EMBODIMENT

Figure 1:
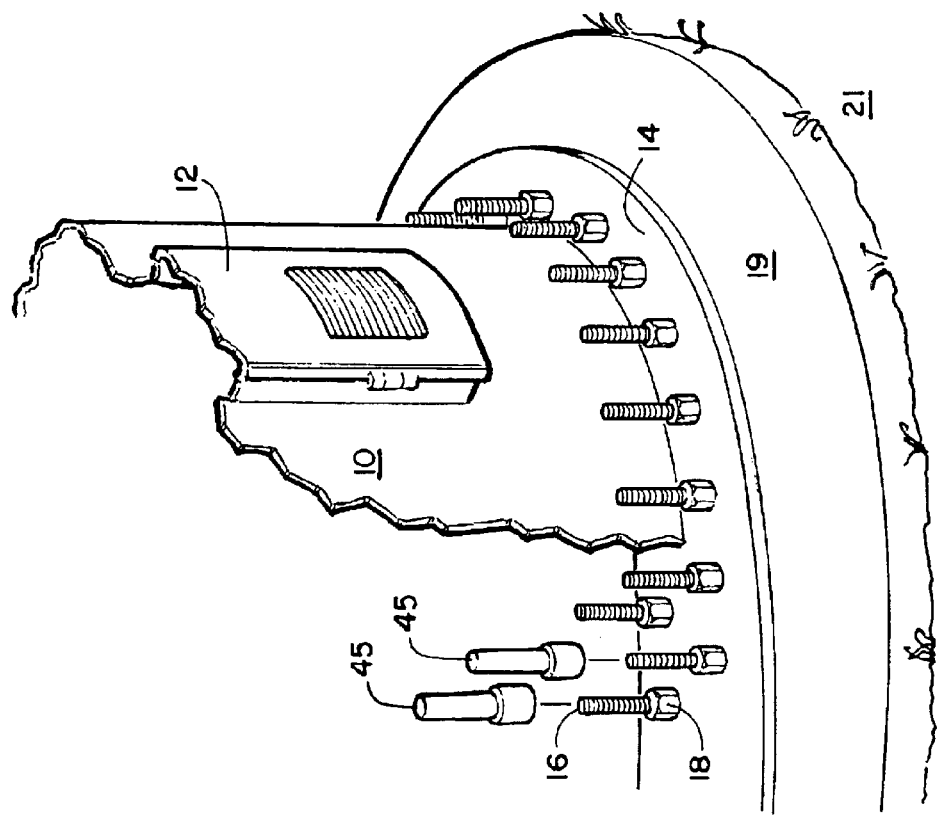
FIG. 1 is a partial front perspective view of the bottom of the tower base of a wind generator illustrating the manner in which it is secured to a concrete base foundation.

The invention will now be described by referring to FIGS. 1–6 of the drawings. FIG. 1 shows the bottom end of the tower base 10 of a wind generator. The tower base is normally about 200 feet high and the wind generator it has multiple blades (not shown) that are rotated by the wind. A door 12 gives access to the interior of the tower base. An outer annular flange 14 is formed on the bottom end of tower base 10 and a similar inner annular flange (not shown) would be on the interior of the tower base 10. The top ends of anchor bolts 16 extend at least 10 inches above the top surface of flange 14 and each has a nut 18 threaded thereon. A concrete walk 19 extends around the perimeter of tower base 10. The base foundation 20 is not seen and it is covered by dirt 21.

Figure 2:
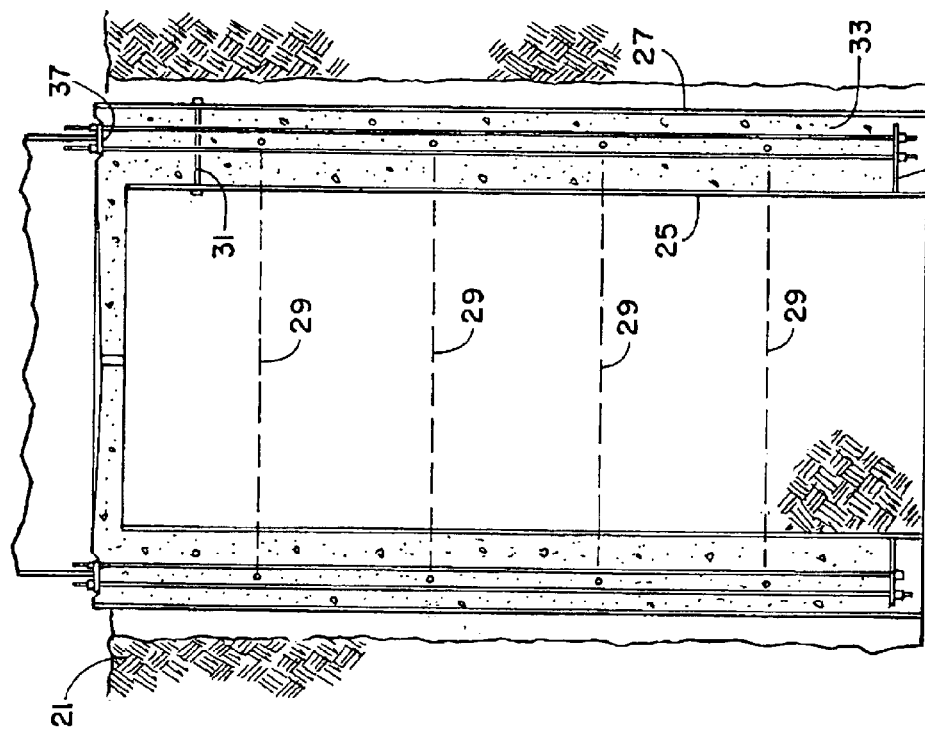
FIG. 2 is a schematic vertical cross section illustrating the construction of the base foundation for the wind generator.

FIG. 2 is a schematic side elevation view of base foundation 20. It is formed on site in a hole approximately 30 feet deep and about 10–15 feet in diameter. A metal embedment ring 23 is placed in the base foundation hole spaced a predetermined distance above the bottom of the hole. Approximately 250 anchor bolts 16 have their bottom ends captured in apertures in the embedment ring and have a nut threaded on to their bottom end. The anchor bolts are oriented in two concentric circular patterns. Each of the anchor bolts 16 has a tubular conduit slid over them to protect them from concrete that is later poured between cylinder inner metal form 25 and cylinder outer metal form 27. Horizontally spaced rebar hoops 29 maintain the anchor bolts in their proper alignment. Spacer rods 31 are located at various positions to keep the respective inner and outer metal forms 25 and 27 in their proper positions. Outer metal form 27 is longer than inner metal form 25 so that when concrete 33 is poured between the respective forms, it will travel downwardly and centrally to form a concrete bottom wall 35. Dirt is filled into the area within the center of metal form 25. A metal template ring 37 has an outer and inner circular pattern of apertures for receiving the top ends of the respective anchor bolts 16. The top surface of metal template ring 37 forms an annular trough that is later filled with grout. When the grout has properly set, the bottom end of tower base 10 is erected on the top surface of metal template ring 37 with the respective top ends of the anchor bolts 14 passing through the respective apertures in the inner flange (not shown) and outer flange 14 in the manner illustrated in FIG. 1.

The next step involves screwing nuts 18 on the top end of anchor bolts 16 following which a second nut is then threaded onto "the top end" of the respective anchor bolts and hydraulic jacks are attached thereto so that the anchor bolts can be stressed to approximately 70 to 80 thousand pounds of stress. At this time the lower nuts are cinched down and the hydraulic jacks and their associated nuts are removed. The exposed threads of the anchor bolts 16 are then covered with a film of grease to keep them protected from attack by oxygen in the air. Anchor caps 45 are then installed over the top end of anchor bolts 16 and with a few strokes of a hammer are frictionally locked in place.

The anchor bolt cap is illustrated in FIGS. 3–5 and is generally designated numeral 45. It would made of a plastic material such as polyproplene with carbon black and also ultra violet inhibitors included in the mixture of the plastic material. Bolt cap 45 has a height H1 in the range of 6–15 inches. It has a nut reception portion 47 having a height H2 in the range of 2–5 inches. It also has an anchor bolt reception portion 49 having a height H3 in the range of 3–12 inches.

Anchor bolt reception portion 49 has a top wall 51 and an cylindrical upper tubular member 53. It also has an outer width D1 and an inner width of D2 in the range of 1.25–1.75 inches. Cavity 55 would preferably be cylindrical and have a diameter only slightly larger than the outer diameter of anchor bolt 16. The bottom end of cylindrical upper tubular member 53 is connected to the top surface of annular upper shoulder 57 that has an outer width D3 and inner width D4. D3 is in the range of 1.25–1.75 inches and D4 is substantially equal to D2. The top end of cylindrical lower tubular member 59 is connected to the bottom surface of annular upper shoulder 57. It has an outer width D5 and inner width D6. D6 is in the range of 2.25–2.75 inches. The inner surface of lower tubular member 59 has closed loop stepped wall portions 61, 63 and 65. Each of these wall portions has a hexagonal configuration. Closed loop stepped wall portion 65 has a width slightly larger than closed loop stepped wall portion 63 which in turn has a slightly greater width than closed loop stepped wall portion 61. Additionally stepped portion 61 slopes away at a 2 degree angle. It is the interior structure of cylindrical lower tubular member 59 that both aligns and centers the anchor bolt cap over the nut 18 onto which it is pounded onto to form a friction fit. Annular lower shoulder 72 is connected to the bottom end of cylindrical lower tubular member 59 and it has an outer width D7. Cylindrical tubular skirt 75 has its top end connected to the bottom surface of annular lower shoulder 72 and it has a width slightly greater than that of washer 80 and a height H4 that is approximately the same height as washer 80.

What is claimed:

1. An anchor bolt cap comprising:
   an upper tubular member having a top end, a bottom end, an outer surface, an inner surface, an outer width D1, an inner width D2 and D1 is greater than D2; said top end of said upper tubular member is closed by a top wall;
   an annular upper shoulder member having a top surface, a bottom surface, an outer width D3, an inner width D4 and said annular upper shoulder member is connected to said bottom end of said upper tubular member and D3 is greater than D1; and
   a lower tubular member having a top end, a bottom end, an outer surface, an inner surface, said inner surface of said lower tubular member is hexagonal; said inner surface of said lower tubular member has at least two closed loop stepped wall portions for wedging over a nut to be received in said lower tubular member; an outer width D5, and D5 is greater than D1; said top end of said lower tubular member is connected to said bottom surface of said annular upper shoulder member.

2. An anchor bolt cap as recited in claim 1 wherein said bolt cap has a height H1 and H1 is in the range of 5–15 inches.

3. An anchor bolt cap as recited in claim 1 wherein said lower tubular member has a height H2 and H2 is in the range of 2–5 inches.

4. An anchor bolt cap as recited in claim 3 wherein said upper tubular member has a height H3 and H3 is in the range of 3–12 inches.

5. An anchor bolt cap as recited in claim 1 wherein said outer surface of said upper tubular member is cylindrical.

6. An anchor bolt cap as recited in claim 5 wherein said inner surface of said upper tubular member is cylindrical.

7. An anchor bolt cap as recited in claim 1 wherein D2 is in the range of 1.25–1.75 inches.

8. An anchor bolt cap as recited in claim 1 wherein said outer surface of said lower tubular member is cylindrical.

9. An anchor bolt cap as recited in claim 1 wherein D6 is in the range of 2.25–2.75 inches.

10. An anchor bolt cap as recited in claim 1 wherein D4 is substantially equal to D2.

11. An anchor bolt cap as recited in claim 1 wherein said bolt cap is made of plastic material.

12. An anchor bolt cap as recited in claim 11 wherein said plastic material includes carbon black and also ultra violet inhibitors.

13. An anchor cap as recited in claim 12 wherein said plastic material is polyproplene.

14. An anchor bolt cap as recited in claim 1 in combination with a vertically oriented anchor bolt extending upwardly from the foundation of a wind generator, said anchor bolt having a top end having an externally threaded outer surface that has a nut tightened thereon; said anchor bolt cap being installed over said top end of said anchor bolt in such a manner that said top end of said anchor bolt is received inside said upper tubular member of said anchor bolt cap and said nut is frictionally received inside said lower tubular member.

15. An anchor bolt cap comprising:
- an upper tubular member having a top end, a bottom end, an outer surface, an inner surface, an outer width D1, an inner width D2 and D1 is greater than D2; said top end of said upper tubular member is closed by a top wall;
- an annular upper shoulder member having a top surface, a bottom surface, an outer width D3, an inner width D4 and said annular upper shoulder member is connected to said bottom end of said upper tubular member and D3 is greater than D1; and
- a lower tubular member having a top end, a bottom end, an outer surface, an inner surface, said inner surface of said lower tubular member is hexagonal; said inner surface of said lower tubular member has at least three closed loop stepped wall portions for wedging over a nut to be received in said tubular member; an outer width D5, and D5 is greater than D1; said top end of said lower tubular member is connected to said bottom surface of said annular upper shoulder member.

16. An anchor bolt cap comprising:
- an upper tubular member having a top end, a bottom end, an outer surface, an inner surface, an outer width D1, an inner width D2 and D1 is greater than D2; said top end of said upper tubular member is closed by a top wall;
- an annular upper shoulder member having a top surface, a bottom surface, an outer width D3, an inner width D4 and said annular upper shoulder member is connected to said bottom end of said upper tubular member and D3 is greater than D1;
- a lower tubular member having a top end, a bottom end, an outer surface, an inner surface, an outer width D5, and D5 is greater than D1; said top end of said lower tubular member is connected to said bottom surface of said annular upper shoulder member, and
- an annular lower shoulder member having a top surface, a bottom surface, an outer width D7, an inner width D8 and said annular lower shoulder member is connected to said bottom end of said lower tubular member and D7 is greater than D5; a tubular skirt having a top end, a bottom end, an outer surface an inner surface and an outer width D7 is connected to said bottom surface of said annular lower shoulder member.

17. An anchor bolt cap as recited in claim 16 wherein said tubular skirt has a height H4 for receiving a washer therein and H4 is in the range of 0.100–0.375 inches.

* * * * *